Dec. 5, 1961   L. H. VAN BILLIARD ET AL   3,012,087
SEA WATER BATTERIES
Filed Dec. 29, 1959   4 Sheets-Sheet 1
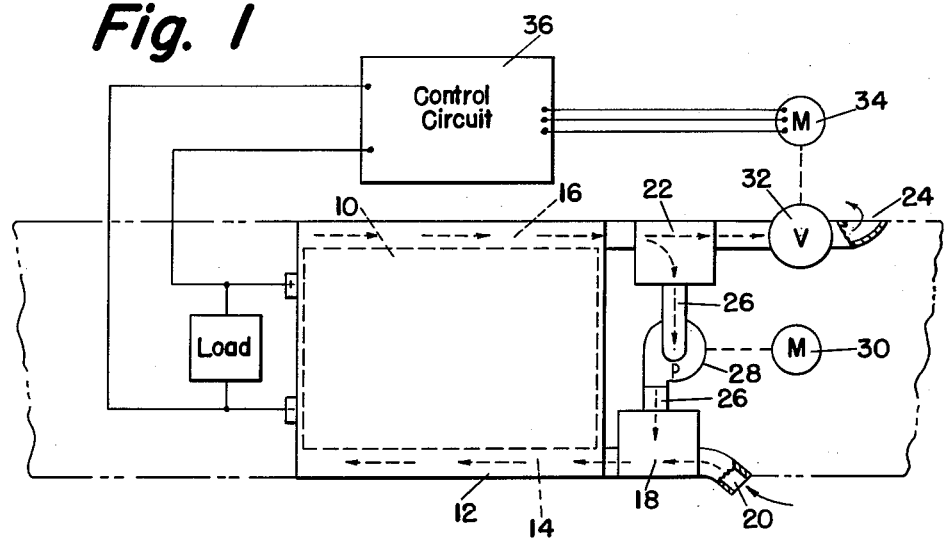
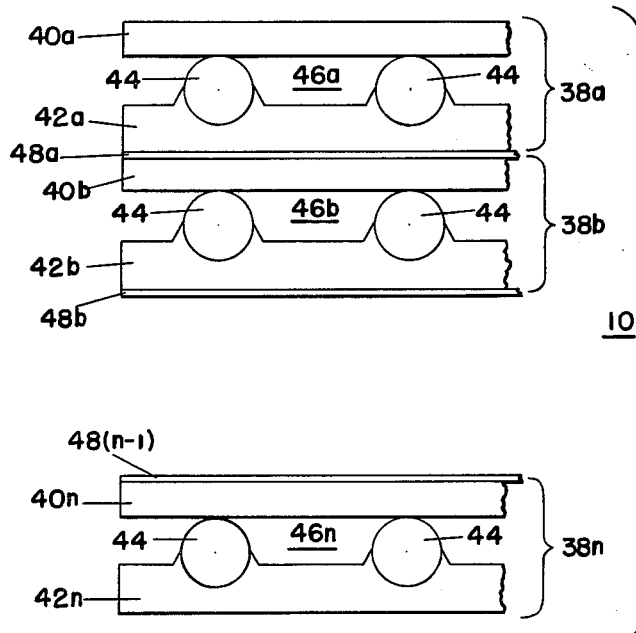
INVENTORS
LEWIS HOWARD VAN BILLIARD
WILLIAM ROBERT GROGAN
BY
Edward W. Hughes
ATTORNEY

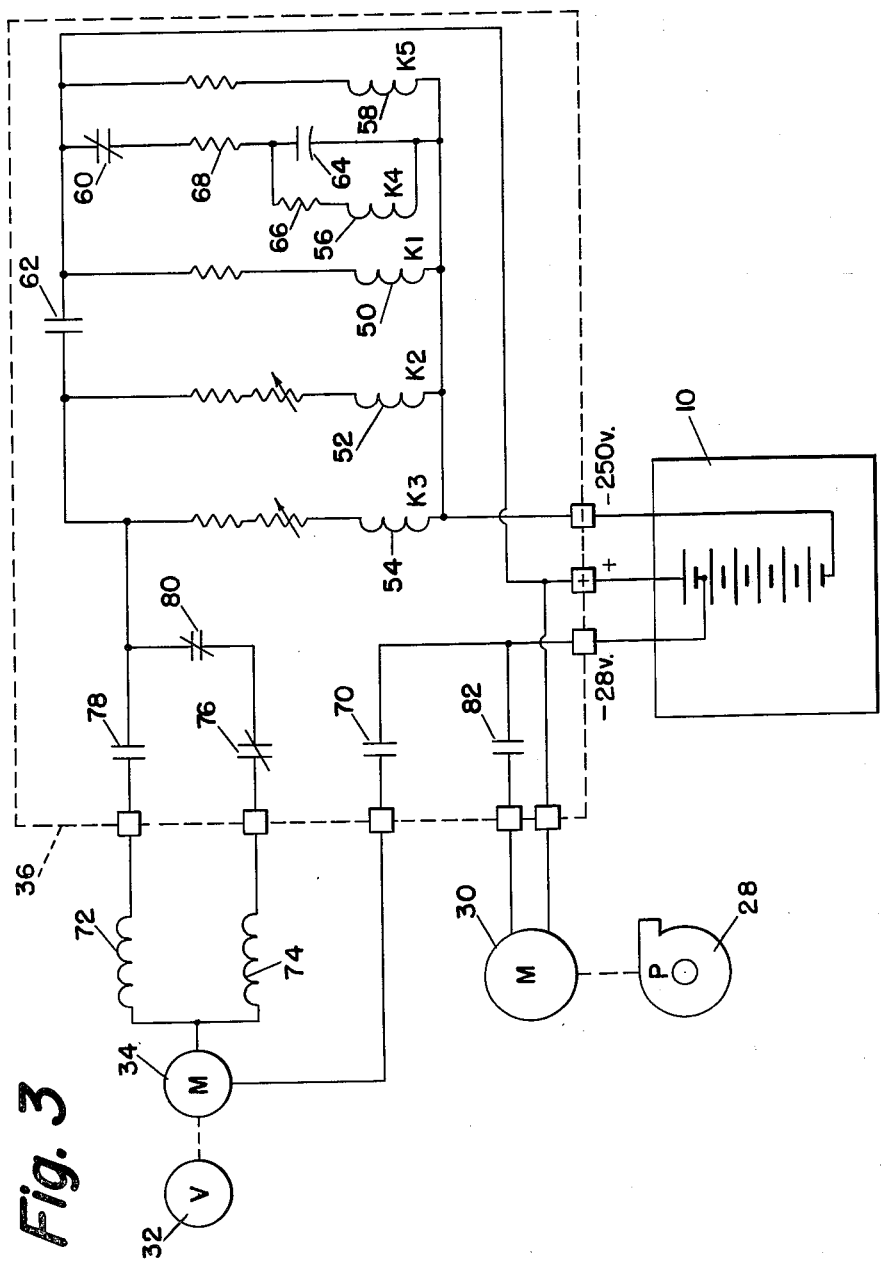

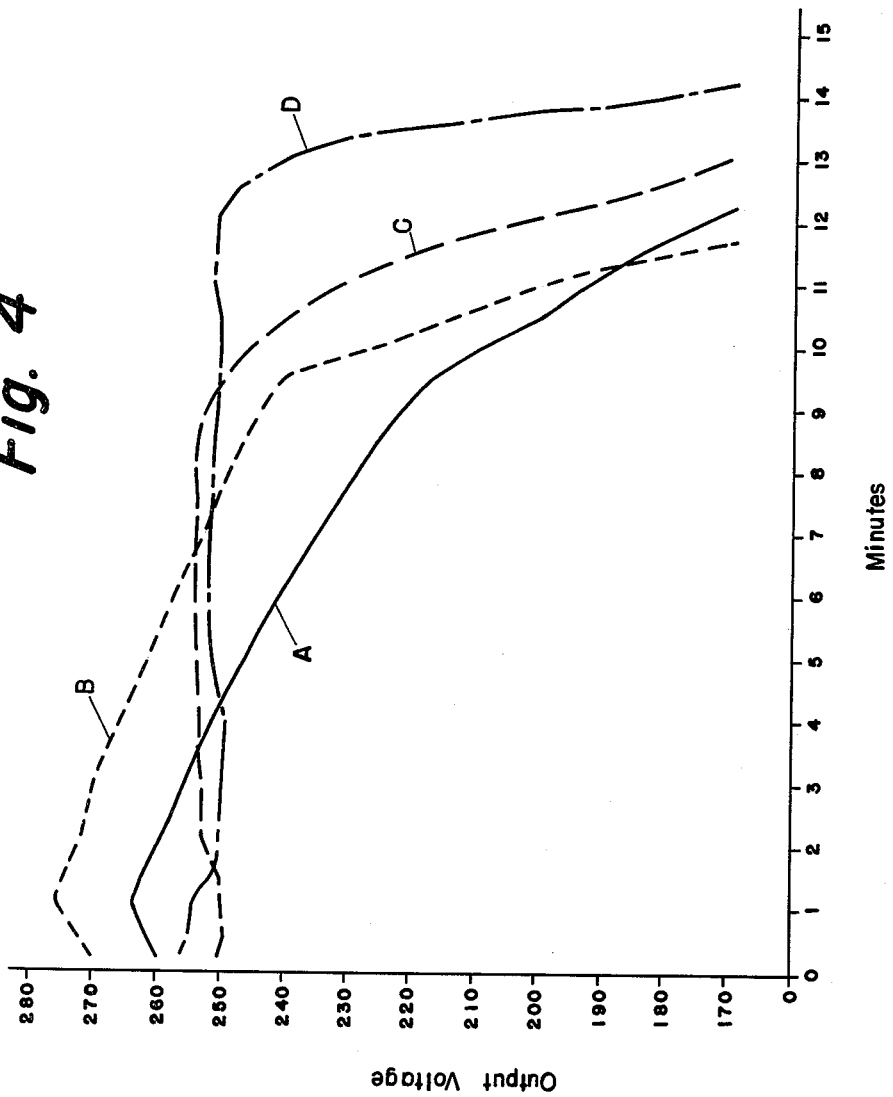

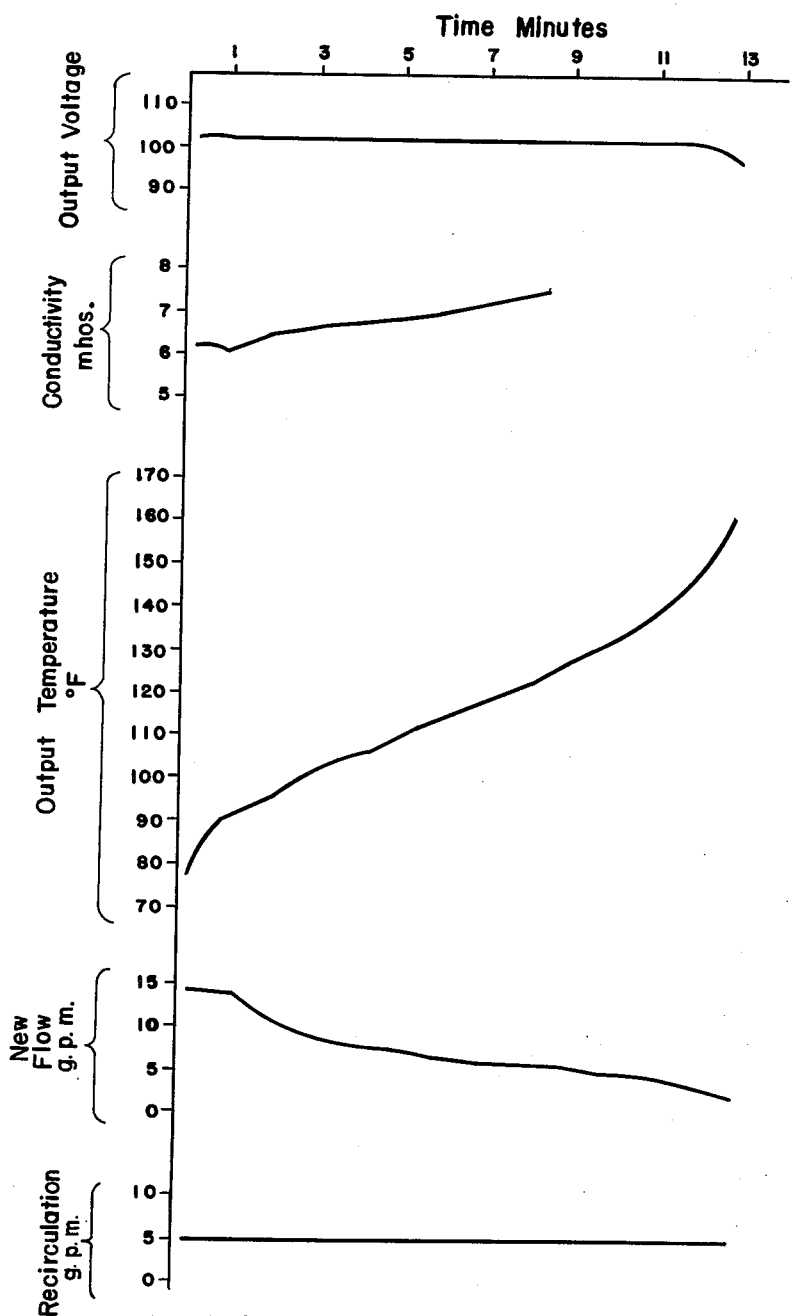

United States Patent Office 3,012,087
Patented Dec. 5, 1961

3,012,087
SEA WATER BATTERIES
Lewis Howard Van Billiard, Dalton, and William R. Grogan, Lee, Mass., assignors to General Electric Company, a corporation of New York
Filed Dec. 29, 1959, Ser. No. 862,516
5 Claims. (Cl. 136—160)

This invention relates to methods and apparatus for controlling the power produced by electrical batteries, and more particularly to methods and apparatus for controlling the power produced by sea water batteries.

Batteries are made from two different materials which have electro-motive forces with respect to hydrogen normally of opposite polarity. A battery cell, or couple, will begin functioning, or have the capability of providing power, whenever the two materials forming a couple are connected by an electrolyte. Aqueous solutions of acids, bases, or salts are suitable for forming an electrolyte. The particular electrolyte used with a given couple is normally the one that produces the best performance from the materials from which the anode and cathode of the couple or cell are made.

Sea water contains a substantial proportion of various salts in solution. The amount of salts in solution in sea water ranges from ¾% to 4½% by weight of the water. As a result, sea water can be used as the electrolyte in some types of batteries. Batteries which can use sea water as their electrolyte, generally referred to as sea water batteries, have many advantages over batteries using acids or bases as their electrolytes because of the natural abundance and distribution of materials which can serve as their electrolyte. As a consequence, sea water batteries, particularly those based on the magnesium, silver chloride couple, have found extensive use as a prime source of power for torpedoes. Sea water batteries have also been used to provide power for other devices such as sonobuoys, life saving equipment, etc. However, their most important use at the present time, as least in terms of quantity of power, has been as the source of primary power for electric torpedoes.

The advantages of the silver chloride, magnesium couple which can use sea water as its electrolyte; namely, a very long shelf life, no need to store the electrolyte, the larger amount of power per unit weight of the battery, and the large amount of power per unit volume of the battery, have contributed to their widespread use for naval purposes. However, like all things, sea water batteries have certain characteristics that it would be desirable to ameliorate or eliminate. One of these is that the magnitude of the output voltage, when the battery is supplying power to a substantially constant load, after reaching a maximum value early in the discharge cycle, decreases with time until the battery ceases to produce sufficient amounts of power to perform its major function. Another of these characteristics is that the magnitude of the output voltage of the battery, when fresh electrolyte is circulated through the battery at a constant rate, is a function of the salinity and temperature of the sea water. The significance of this characteristic becomes apparent when it is realized that the salinity of sea water varies from ¾% to 4½% and its temperature varies from about 93° F. to about 28° F.

An ideal characteristic for any battery is that its output voltage be substantially constant during the period of discharge until substantially all the power that the battery is capable of providing has been supplied. In a sea water battery, it is highly desirable that the voltage produced be substantially independent of the salinity and temperature of the sea water serving as its electrolyte. It has been discovered that by recirculating through a sea water battery some of the electrolyte that has passed through at at least once and as a consequence has had its temperature and salinity increased, it is possible to maintain the output voltage of such a battery substantially constant with time until practically all the active materials of its plates have been consumed. Electrolyte that has passed through the battery will hereafter be referred to as used electrolyte.

It is, therefore, an object of this invention to provide improved means and methods for regulating the output voltage of batteries.

It is another object of this invention to control the output voltage produced by batteries by regulating the temperature of the electrolyte.

It is still another object of this invention to regulate the output voltage of batteries by controlling the chemical composition of the electrolyte.

It is a further object of this invention to control the voltage produced by a sea water battery by regulating both the temperature and the chemical composition of its electrolyte.

It is still a further object of this invention to increase the efficiency of batteries by causing them to consume, at optimum rates, the active materials from which the cells are constructed.

It is another object of this invention to further increase the efficiency of sea water batteries by increasing the conductivity of the electrolyte.

Other objects and many of the attendant advantages of this invention will become obvious upon a study of the following specification when considered in conjunction with the accompanying drawings, in which:

FIG. 1 is a schematic diagram of apparatus for regulating the output voltage of a sea water battery;

FIG. 2 is a fragmentary view on an exaggerated scale illustrating the details of construction of a sea water battery;

FIG. 3 is a schematic of the control circuitry illustrated in block form of FIG. 1;

FIG. 4 is a group of graphs of the output voltage plotted against time of comparable sea water batteries when power is being supplied to a constant load under varying operating conditions;

FIG. 5 is a graph illustrating how various parameters vary during the discharge cycle of a sea water battery incorporating recirculation and voltage control of rate of admission of fresh electrolyte.

Referring now to FIG 1, sea water battery 10 is shown as being mounted in a battery casing or compartment 12. Battery compartment 12, particularly where the battery is being used to provide power to a torpedo which is not illustrated, may constitute or be located within a separable portion of the torpedo. Located in the lower portion of battery compartment 12 is an inlet passage 14, and in the upper portion of compartment 12 there is located exist passage 16. Inlet passage 14 is connected to an inlet manifold 18. Entrance 20, which admits sea water, or fresh electrolyte, into manifold 18 in some torpedo applications, takes the form of a scoop, as is illustrated in FIG 1. Exit passage 16 of the battery compartment 12 is connected to an outlet manifold 22 which is provided with an outlet 24 through which electrolyte that has passed through battery 10 can return to the sea. A recirculation passage 26 provides a conduit so that some or all of the used electrolyte in outlet manifold 22 can be returned to inlet manifold 18. Pump 28, a centrifugal pump in a preferred example, which is driven by a conventional electric motor 30, forces electrolyte from outlet manifold 22 to inlet manifold 18. Between that portion of the outlet manifold 22 where conduit 26 connects with it and its exit opening 24, there is located an adjustable flow control valve 32 which controls the amount of the used electrolyte that returns to the ambient sea. Valve 32 is driven by reversible valve motor 34 which is controlled by control circuit 36 so that the amount of used electrolyte that flows out of manifold 22 through exit 24 is controlled by the magnitude of the output voltage of battery 10 as will be described with respect to FIG. 3. The amount of fresh sea water that is admitted into inlet manifold 18 is of course equal to the amount of used electrolyte returned to the sea after all the space, passages, and manifolds are filled. The force or pressure necessary to cause sea water to flow into inlet manifold 18, and then through inlet passage 14, battery 10, exist passage 16, exit manifold 22, and thence back to the sea through outlet 24, as indicated by the arrows in FIG. 1, is provided in most torpedoes by the reaction of the water acting on scoop 20 as the torpedo moves through the sea.

In FIG. 2, there are illustrated details of the construction of battery 10. Battery 10 is made up of a plurality of magnesium, silver chloride couples, or cells, 38a, 38b–38n in a preferred example, arranged with respect to each other as illustrated. Each of the couples 38a–38n consists of a sheet or plate of magnesium 40a, 40b–40n which is spaced a short distance from a sheet or plate of silver chloride 42a, 42b–42n. Embedded on one side of each sheet of silver chloride 42a, 42b–42n are a plurality of glass beads 44 which space the magnesium sheets 40 from the silver chloride sheet 42 by a controlled distance 46a, 46b–46n. It is desirable that this distance or space, 46a, 46b–46n be the minimum which will still be sufficient to permit relatively free flow of the electrolyte through the cells. A thin sheet of silver foil 48a, 48b–48n-1 is placed between adjacent couples, such as sheet 48a between couples 38a, 38b, to provide low electrical impedance between them while minimizing electro-chemical action between the magnesium cathode 40b of couple 38b and the silver chloride anode 42a of couple 38a, for example. The couples 38a, 38n are placed one on top of the other so that electrically they are in series. The anode, or positive terminal, of battery 10 will be the sheet of silver chloride 42n of couple 38n while its cathode, or negative terminal, will be the sheet of magnesium 40a of couple 38a. The output voltage of the battery will be approximately equal to the potential of one magnesium silver chloride couple 38, multiplied by the number of couples "n" where "n" is any integer other than zero. The amount of current produced by battery 10 will be a function of the areas of the plates of magnesium and silver chloride defining the spaces or gaps 46a, 46b–46n. The total power available is a function of the thickness of the magnesium plates 40a, 40b–40n and of the silver chloride plates 42a, 42b–42n.

FIG. 3 is a schematic of the control circuit 36 and associated elements which in response to the magnitude of the output voltage of battery 10, adjusts the rate at which used electrolyte is returned to the sea and/or fresh electrolyte admitted to inlet manifold 18, to maintain the output voltage of battery 10 within desired limits. Battery 10, in the embodiment illustrated, is designed to have an output voltage of 250 volts D.C. ± 5 volts. The solenoids 50, 52, 54, 56, and 58 of relays K1, K2, K3, K4, and K5 of circuit 36 are connected so that they have, or can have, the output voltage of battery 10 applied across them. In FIG. 3, only the solenoids and contacts of these relays are illustrated. The relays used are conventional hermetically sealed armature actuated types. Relay K4 and its associated circuitry are so designed that its solenoid 56 will be energized when the voltage across it exceeds 65 volts. As soon as solenoid 56 is energized, the normally closed contact 60 of relay K4 open, and the normally open contacts 62 of relay K4 close. As soon as the voltage across capacitor 64 drops below 65 volts due to its being discharged through resistor 66 and solenoid 56 to the anode of battery 10 which is considered to be at ground or reference potential, solenoid 56 will be de-energized. This causes contacts 60 to close and contacts 62 to open. Capacitor 64 will then charge through resistor 68 until such time as the voltage across capacitor 64 exceeds 65 volts, at which time solenoid 56 will be re-energized. In this manner contacts 62 will be closed for a given period of time, one to two seconds, at a repetition rate, which in a preferred example is once every four to six seconds. The repetition rate can be varied since it is determined by the time constant of the circuit used to energize solenoid 56.

When the output voltage of the battery 10 reaches 210 volts, solenoid 50 of relay K1 is so designed that it will be energized. This causes contacts 70 to close to complete a circuit from the negative 28 volt terminal of battery 10 to reversible valve motor 34. Motor 34, however, will not be energized until a circuit is completed to the positive terminal of the battery 10 through either winding 72 or winding 74 of motor 34.

During the period contacts 62 of relay K4 close as described earlier, it becomes possible to complete a circuit from motor 34 through winding 72 or winding 74 to the anode of battery 10. At the same time, the output voltage of battery 10 is connected across the solenoids 52, 54 of relays K2, K3. Current will flow through windings 72, 74 depending on the condition of contacts 76 of relay K3 and contacts 78, 80 of relay K2. Solenoid 54 of relay K3 is designed to become energized when the output voltage of battery 10 equals or exceeds 245 volts. Solenoid 52 of relay K2 is designed to become energized when the output voltage of battery 10 equals or exceeds 255 volts. Thus, during the time the output voltage of battery 10 exceeds 210 volts but is less than 245 volts, motor 34 will be energized through the normally closed contacts 76, 80 each time contacts 62 are closed. Energizing motor 34 through winding 74 causes motor 34 to change the setting of valve 32 to decrease the flow of electrolyte through valve 32. This tends to increase the output voltage of battery 10.

During the period when the output voltage is within the desired range of from 245 to 255 volts, solenoid 54 of relay K3 will be energized each time contacts 62 close. This causes normally closed contacts 76 to open. However, solenoid 52 of relay K2 will not be energized so that contacts 78 will remain open. Thus, during the time the output voltage of battery 10 is within the desired range, motor 34 will not be energized, and no change will take place in the setting of valve 32 and the rate of flow of electrolyte through valve 32.

When, however, the output voltage of battery 10 exceeds 255 volts, both solenoids 52 and 54 will be energized each time contacts 62 close. This causes normally closed contacts 76, 80 to open and contacts 78 to close. Motor 34 will then be energized with current flowing through winding 72. This causes motor 34 to turn in the direction to cause the setting of valve 32 to change in the direction which will increase the rate of flow of electrolyte through valve 32 to increase the rate that fresh sea water is admitted into inlet manifold 18 to reduce the temperature of the electrolyte in inlet passage 14, which tends to lower the output voltage of battery 10.

Solenoid 58 of relay K5 is designed so that it will be energized when the output voltage of battery 10 exceeds 150 volts. When this happens, contacts 82 of relay K5 close to energize recirculation pump motor 30. This causes pump 28 to force used electrolyte from exit manifold 22 through conduit 26 to inlet manifold 18, where the recirculated, or used, electrolyte and fresh sea water in an amount equal to the amount of used electrolyte being returned to the sea, are mixed prior to their flowing through the cells of battery 10.

Other forms of control circuitry to regulate the setting of flow control valve 32 to control the rate that used electrolyte returns to the sea could be used than that described above. In a torpedo, control circuitry 36, motor 34, and valve 32 and associated wiring are located within the hull of the torpedo. Likewise, it is within the teaching of this invention to vary the rate of recirculation by varying the speed at which pump 28 is operated to control the magnitude of the output voltage. Effective control to the degree needed in present day application of sea water batteries has been achieved by recirculation of the electrolyte at fixed rates ranging from 10% to 50% of the maximum rate of admission of fresh sea water. Temperature control of the electrolyte can also be achieved by passing the used electrolyte through heat exchangers rather than by mixing recirculated or used electrolyte with fresh electrolyte.

In FIG. 4, typical curves obtained by plotting output voltage against time are reproduced. These curves were obtained in tests of equivalent sea water batteries under the following conditions:

| Curve | A | B | C | D |
|---|---|---|---|---|
| Temperature of Input, °F | 40 | 40 | 55 | 45 |
| Salinity, percent | 3.5 | 3.5 | 2.5 | 2.5 |
| Input Flow, g.p.m | 10 | 10 | Controlled | Controlled |
| Recirculation, g.p.m | None | 5 | None | 5 |
| Load, ohms | 1.3 | 1.3 | 1.3 | 1.3 |

The area under each curve represents the total energy that a battery is capable of supplying.

Curve A is typical of that produced by sea water batteries when the rate at which sea water electrolyte is circulated through the battery is substantially constant and none of the used electrolyte is recirculated through the battery, or all the used electrolyte is returned to the sea. When the rate of flow of the electrolyte through the sea water battery of a torpedo is determined principally by the speed of the torpedo, the profile of output voltage of the battery will be similar to that of curve A. The gradual decrease in the output voltage with time after the maximum value is reached is attributed in part to the gradual increase of the internal resistance of the battery. This is due to the increase in width of the gap between the magnesium plate and silver chloride plate of each couple as the outer layers of the magnesium plates go into solution. This increases the size or width of gap 46 and the amount of the electrolyte through which the current of the battery must flow. Since sea water has appreciable resistance, the increase of width 46 increases appreciably the internal resistance of the battery. Some of the decrease in voltage can also be attributed to the fact that part of the surface of the silver chloride plate will have been reduced to silver. This reduces the active area of the anode, that part which has chloride ions to give up to the electrolyte. It should also be understood that the output voltage of a sea water battery under these conditions will vary as a function of the salinity of the sea water, expressed in terms of percent of weight of the salts in solution to total weight of the solution, and the temperature of the sea water. An increase in temperature of the electrolyte will increase the output voltage as this tends to increase the rate at which the chemical reactions occur which produce the electric power, to an even greater degree than the increase in resistance of the electrolyte, due to the same increase in temperature, increases the internal resistance of the battery. Increasing the salinity of the electrolyte, other variables remaining the same, also increases the output voltage of a sea water battery since this reduces the resistance or increases the conductivity of the electrolyte and thus reduces internal resistance of the battery.

Curve B was obtained by recirculating electrolyte that had passed through the battery back to the input manifold at a fixed rate of five gallons per minute in the example plotted. Fresh electrolyte supplied at the rate of ten gallons per minute was mixed with the recirculated electrolyte. A comparison of curves A and B reveals that they are similar but that curve B is displaced upwardly. The output voltage still decreases with time after reaching a maximum early in the run but the area under curve B, or the total useful energy at useful voltage levels is substantially greater than under curve A.

As the electrolyte flows upward through each couple or cell of the battery, it picks up heat from the chemical reactions occurring which produce electric power, and from electrical heating due to the current of the battery flowing through it. The amount of electrical heating is equal to the resistance of the electrolyte multiplied by the current of the battery, squared. These two effects increase the temperature of the electrolyte a substantial amount. Also, while the battery is producing electric power, magnesium ions and chloride ions are going into the solution in the electrolyte. As a consequence, the salinity of the electrolyte is increased. Recirculating part, ⅓ in this example, of the used electrolyte thus raises the initial temperature and salinity of the electrolyte in the inlet passage 14 as compared with ambient sea water, for example. As a consequence, the rate of chemical activity with recirculation is greater than when recirculation is not used. This accounts for part of the increase of output voltage observed when recirculation is used. The increase in salinity of the electrolyte reduces the resistance of the electrolyte so that the internal resistance of the battery is less. This is another reason why the output voltage of a sea water battery is greater with recirculation than without it.

When recirculation is not used, it was discovered that the active materials from which the plates of the couples were formed would be consumed faster at the upper part of the cells than at the lower portions. This is because the chemical activity in the cells and the rate of consumption of the plates is a function of the temperature of the electrolyte. Recirculation by raising the initial or input temperature of the electrolyte tends to cause the chemical reactions to take place at approximately the same rates at the bottom of the cells as well as at the top. As a result, substantially all the material of all the cells will be totally consumed at the same time.

Curve C of FIG. 4 is typical of that produced by a sea water battery in which the rate of flow of electrolyte through the battery alone is varied or controlled by means such as are illustrated in FIG. 1. As can be seen, the output voltage of the battery remains essentially constant for a substantial part of the discharge period. What in essence is being controlled when the rate of flow of fresh electrolyte into the inlet manifold is regulated in this manner is the mean temperature of the electrolyte. The electrolyte as it flows from the bottom to the top of a battery couple acquires heat, as was explained supra, from the chemical reactions and from the current flowing through electrolyte. The temperature of the electrolyte rises from its initial temperature in the inlet passage as it moves toward the top of each cell. The maximum temperature of the electrolyte in the exit passage, other things remaining constant, depends on the initial temperature of the electrolyte and how long it takes for the electrolyte to travel from the bottom to the top of a cell, or the rate of flow of the electrolyte through the cell. From curve C, it can be seen that controlling the input temperature of the electrolyte provides an effective way to control the output voltage.

Curve D is a plot of the output voltage of a sea water battery when recirculation and voltage control, as taught in the invention, are used. Good voltage control is obtained over a significantly longer period of time than with any of the previous arrangements. Further, the total useful power under curve D is also significantly larger than was achieved under any of these previous arrangements. Tests have shown that, with both recirculation and voltage control, the output voltage versus time characteristics are substantially independent of the temperature and salinity of ambient sea water throughout the world. In fact, under these conditions a sea water battery will work with fresh or drinking water as the fresh electrolyte. The increased area under curve D is believed to be due to using the materials of the battery couples at the optimum rates by controlling both the temperature and chemical composition of the electrolyte. As a result the maximum useful power output at desired power levels is obtained.

FIG. 5 is a graph which illustrates how temperature and conductivity of electrolyte and rate of admission of fresh electrolyte vary during a typical run to maintain the output voltage, or performance of the battery, substantially constant until approximately all the active materials of the battery have been consumed. The battery from which the data for FIG. 5 was derived consisted of 91 silver chloride magnesium couples so that the design output voltage was approximately 102 volts. From FIG. 5, it can be seen that as the rate of admission of fresh sea water decreased, the temperature and conductivity of the electrolyte increased. The rate of recirculation of used electrolyte was held constant throughout the discharge cycle.

The data for FIGS. 4 and 5 was obtained with a substantially constant load connected across the battery so that the power supplied by the batteries was substantially constant. The method and apparatus for maintaining the output voltage substantially constant during the discharge cycle constituting this invention is effective in maintaining output voltage of batteries substantially constant or the performance of batteries at desired values, even if variations in the magnitude of the load occur during the discharge cycle as long as the maximum power ratings of the battery are not exceeded.

From the foregoing, it can be seen that controlling the output voltage of batteries by regulating the temperature and chemical properties of their electrolyte makes batteries more efficient sources of power. The principles, methods and techniques for regulating the output voltage of batteries constituting this invention are applicable to primary and secondary batteries.

Obviously, many modifications and variations of the present invention are possible in the light of the above teachings. It is, however, to be understood that within the scope of the appended claims, the invention may be practiced other than is specifically described and illustrated.

What is claimed is:

1. In a sea water battery made from a plurality of magnesium silver chloride couples connected in series, each of said couples being made of sheets of said materials spaced a short distance apart to define a gap, said battery being mounted in a battery compartment, and said compartment having an inlet passage and an outlet passage in communication with the top and bottom of the gap of each couple to permit the circulation of electrolyte through said gaps; the improvements comprising a pump for pumping sea water electrolyte that has passed through the battery back to the inlet passage, an adjustable flow control valve for controlling the amount of electrolyte in the outlet passage that returns to the sea, and control means for said valve, said control means responsive to the magnitude of the output voltage of the battery for causing said valve to vary the rate at which electrolyte flows back to sea as a function of the magnitude of the output voltage of the battery; whereby the output voltage of the battery is maintained within a predetermined range of values.

2. In combination a sea water battery made from a plurality of magnesium silver chloride couples connected in series, each of said couples being constructed of sheets of said materials spaced a short distance apart, a battery compartment having an inlet passage and an outlet passage, said battery being mounted in a battery compartment so that sea water can flow in the space between the materials forming each battery couple from the inlet passage to the outlet passage, a pump for pumping at a substantially fixed rate used sea water electrolyte from the outlet passage back to the inlet passage, valve means for controlling the rate at which fresh sea water is admitted to the inlet passage, and control means for said valve means, said control means responsive to the magnitude of the output voltage of the battery for causing said valve means to increase the rate of admission of fresh sea water to the inlet passage when the output voltage of the battery exceeds a predetermined value, and to reduce the rate of admission of fresh sea water when the output voltage falls below a predetermined value.

3. In combination, an electrical battery using sea water as its electrolyte; said battery being mounted in a compartment having an inlet passage and an outlet passage through which sea water flows into the compartment, through the battery, and then out of the compartment; an inlet plenum chamber connected with the inlet passage, said inlet plenum chamber having an inlet opening for admitting sea water into said chamber; an outlet plenum chamber connected to the output passage, said outlet plenum chamber having an opening through which the contents of said outlet chamber return to the sea; a recirculation passage between the outlet plenum chamber and the inlet plenum chamber; a pump mounted in the recirculation passage for pumping sea water electrolyte from the outlet plenum chamber back to the inlet plenum chamber, where it can mix with incoming fresh sea water; a flow control valve mounted in the exit plenum chamber between the place where the recirculating passage connects with the exit plenum chamber and said opening of the plenum chamber; a valve motor for changing the setting of the valve; and a control circuit, responsive to the magnitude of the output voltage of the battery, for controlling the energization of the valve motor to vary the amount of electrolyte which flows through the valve to maintain the output voltage of the battery within predetermined limits until substantially all the useful energy of the battery has been expended.

4. In combination an electrical battery using sea water as the electrolyte; a compartment having an inlet passage and an outlet passage, said battery being mounted in the compartment so that sea water can flow into the compartment, through the battery, and then out the compartment; an inlet plenum chamber in communication with the inlet passage, said inlet plenum chamber having an inlet scoop for forcing sea water into said chamber as the scoop moves through the water; an outlet plenum chamber in communication with the output passage, said outlet chamber having an opening to permit the contents of said outlet chamber to be returned to the sea; a recirculation passage between the outlet plenum chamber and the inlet plenum chamber; a pump for pumping sea water electrolyte from the outlet plenum chamber through the recirculation passage to the inlet plenum chamber where it mixes with incoming fresh sea water; a flow control valve mounted in the exit plenum chamber between the place where the recirculation passage connects with the exit plenum chamber and said opening of the plenum chamber; a reversible valve motor for changing the setting of the flow control valve; and control means responsive to the magnitude of the output voltage of the battery for controlling the valve motor to vary the setting of the flow conrol valve so that the amount of electrolyte which flows through the valve is a function of the output voltage of the battery.

5. A battery having at least one cell having plates, a battery compartment having an inlet passage and an outlet passage, said battery being mounted in said compartment so that electrolyte can flow in the space between said plates from said inlet to said outlet, a pump for pumping used electrolyte from said outlet back to said inlet, means responsive to the output voltage of said battery for controlling the amount of used electrolyte recirculated and the amount of fresh electrolyte added to maintain the electrolyte temperature within a range and the electrolyte chemical composition of a concentration to permit optimum use of battery electrode material and to optimize battery performance.

References Cited in the file of this patent

UNITED STATES PATENTS

| | | |
|---|---|---|
| 1,572,403 | Mershon | Feb. 9, 1926 |
| 2,626,971 | Mansoff | Jan. 27, 1953 |
| 2,700,064 | Akerman | Jan. 18, 1955 |
| 2,706,213 | Lucas | Apr. 12, 1955 |

FOREIGN PATENTS

| | | |
|---|---|---|
| 23,306 | Great Britain | Nov. 5, 1898 |